United States Patent [19]

Cathell

[11] 4,105,957
[45] Aug. 8, 1978

[54] FULL WAVE BRIDGE POWER INVERTER

[75] Inventor: Frank Cathell, San Diego, Calif.

[73] Assignee: Qualidyne Systems, Inc., Chula Vista, Calif.

[21] Appl. No.: 835,403

[22] Filed: Sep. 21, 1977

[51] Int. Cl.² .................. H02M 7/537; H03K 3/30
[52] U.S. Cl. ................... 331/110; 331/113 A; 363/17; 363/132
[58] Field of Search ........... 331/113 A, 110; 363/17, 363/132, 136

[56] References Cited

U.S. PATENT DOCUMENTS

| | | | |
|---|---|---|---|
| 2,821,639 | 1/1958 | Bright et al. | 331/113 A X |
| 2,872,582 | 2/1959 | Norton | 331/113 A X |
| 3,015,771 | 1/1962 | Mesenhimer | 331/113 A X |
| 3,317,815 | 5/1967 | Merritt | 321/45 R |
| 3,344,336 | 9/1967 | Moyer et al. | 321/18 |
| 3,414,801 | 12/1968 | Bishop et al. | 331/113 A X |
| 3,441,832 | 4/1969 | Leu | 321/45 R |
| 3,699,358 | 10/1972 | Wilkinson | 307/242 |
| 3,710,229 | 1/1973 | Jessee | 321/45 R |
| 3,737,756 | 6/1973 | Hasley et al. | 331/113 A X |
| 3,851,240 | 11/1974 | Park et al. | 321/45 R |
| 3,887,861 | 6/1975 | Anzai et al. | 321/45 R X |
| 4,017,783 | 4/1977 | Assow et al. | 321/45 R X |

Primary Examiner—Siegfried H. Grimm
Attorney, Agent, or Firm—Lowe, King, Price & Markva

[57] ABSTRACT

A full bridge inverter includes four bipolar transistors of like conductivity type, connected in a bridge circuit including an apex to which a load is connected. During a first time interval, emitter collector paths of a first pair of transistors are connected between a DC source and the apex so that current flows in a first direction through the apex while the transistors are forward biased. The emitter collector paths of a second pair of transistors are connected with the source and the apex so that current flows in a second direction through the apex during a second interval while the transistors of the second pair are forward biased. A first transformer has first and second windings respectively connected in series with the emitters of the transistors of the first pair, such that voltages at the emitters of the transistors of the first pair have a tendency to vary in the same direction. A second transformer has third and fourth windings connected in series with the emitters of the transistors of the second pair, with the windings being wound so that the voltages at the emitters of the transistors of the second pair have a tendency to vary in the same direction. Thereby, the turn-on and turn-off times of the transistors of the two pairs are simultaneous, to equalize turn-on losses and distributed turn-off losses between the transistors.

7 Claims, 1 Drawing Figure

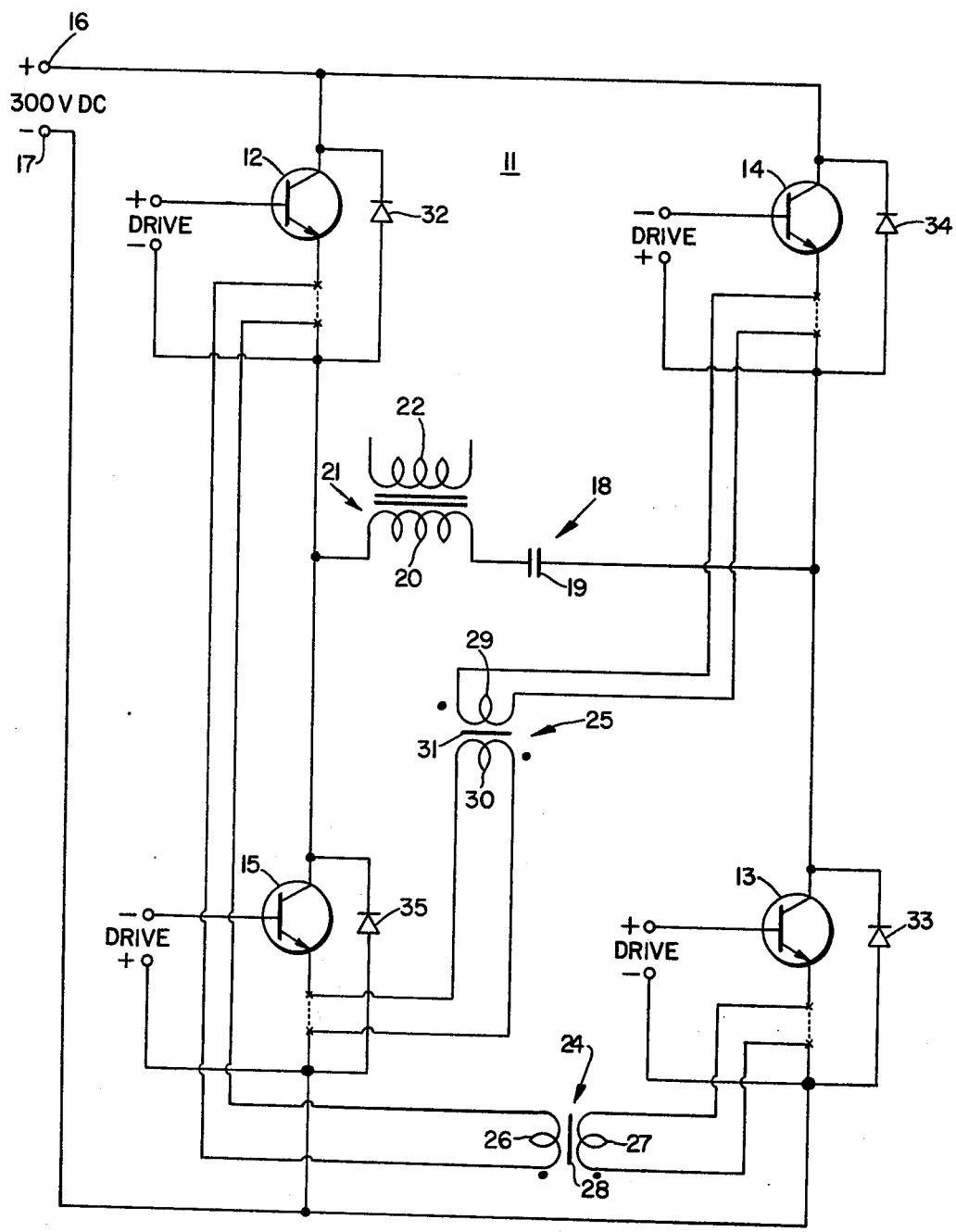

FULL WAVE BRIDGE POWER INVERTER

FIELD OF THE INVENTION

The present invention relates generally to full bridge inverters, and more particularly to a full bridge inverter wherein the turn-on and turn-off times of each switching element of a pair of unmatched switching elements are substantially simultaneous.

BACKGROUND OF THE INVENTION

Full bridge inverters employing switching elements are well known in the art. Typically, such circuits include four bipolar transistors of like conductivity type. A first pair of the transistors is connected in a first series circuit between a DC power source and a bridge apex that is connected to a load so that current flows in a first direction through the apex during a first time interval while both transistors of the first pair are forward biased. A second pair of the transistors is connected in a second series circuit between the DC source and the apex so that current flows in a second direction through the apex during a second time interval while the transistors of the second pair are forward biased. Forward biasing of the transistors of the first and second pairs occurs during alternate half cycles of a time reference AC source, typically coupled in out of phase relationship between the base and emitters of the transistors of the two pairs. Typical of prior art patents disclosing such circuits are Bright et al, U.S. Pat. No. 2,821,639, and Norton, U.S. Pat. No. 2,872,582.

Because the switching transistors of one pair are essentially in series while they are forward biased into conduction, it is advantageous for the switching transition times of these transistors to be the same; it is particularly advantageous for the cut-off times of the transistors of each pair to be the same. The necessity for simultaneous transition times of the switching transistors of each pair can be obviated if the power ratings of the transistors are very large. However, it is not advantageous to provide transistors with excessively large power ratings becuse of cost, heat dissipation and size.

If transistors with low power ratings are used, they must have simultaneous conduction and cut-off times for numerous reasons. In particular, if the low power transistors are simultaneously activated into the forward biased condition, turn-on losses of both transistors of one pair are equalized, to provide equal heat losses in both transistors and symmetrical heat sinking. Simultaneous turn-off times of the two transistors distributes turn-off losses equally between the two transistors of a pair. If one transistor turns off appreciably before the other, there is equal power dissipation. The transistor which turns off first must sustain a full load current while it is in a cut-off condition, as well as the relatively high inductive voltage which results from a collapsing magnetic field of a transformer in the apex. The slower transistor has essentially no dissipation during turn off because the current through it is interrupted by the turn off of the faster transistor. Equalizing the turn-on and turn-off times of the transistors of a single pair greatly reduces switching noise and transients. If both transistors of a pair are simultaneously turned on and turned off, the open circuit emitter collector voltage of each transistor can materially be reduced.

In the prior art, it is difficult to obtain inexpensive, off-the-shelf transistors that are matched to have characteristics so that they simultaneously are activated into a conducting state and deactivated into a cut-off state. Of course, matched transistor pairs, having these desired characteristics exist, but the price of such matched pairs is generally significantly higher than the price of unmatched, off-the-shelf transistors.

In view of the foregoing, it is an object of the present invention to provide a new and improved full bridge inverter having switching elements that are simultaneously turned on and turned off in pairs.

A further object of the invention is to provide a new and improved full bridge inverter wherein conventional, off-the-shelf, relatively low power bipolar transistors can be employed as switching elements.

A further object of the invention is to provide a full bridge switching inverter employing switching transistors having relatively low open circuit emitter collector voltage ratings.

Still another object of the invention is to provide a new and improved full bridge switching inverter wherein there is a substantial reduction of noise and transients associated with the switching elements being activated into and out of a conducting state.

BRIEF DESCRIPTION OF THE INVENTION

In accordance with the present invention, the turn-on and turn-off times of a pair of unmatched, low power transistors in each of first and second series circuits of a full bridge inverter are forced to be substantially the same by transformer coupling the emitters of the transistors in each pair to each other. In particular, a first transformer includes first and second windings connected as series elements of the first series circuit. Terminals of the first and second windings are respectively connected to the emitters of first and second transistors included in the first series circuit. A second transformer includes third and fourth windings connected as series elements of the second series circuit. The third and fourth windings have terminals respectively connected to the emitters of the third and fourth transistors. To provide the simultaneous turn-on and turn-off times, the windings of the first and second transformers are arranged so that the emitter voltages of the first circuit have a tendency to vary in the same direction, and the emitter voltages of the transistors of the second circuit have a tendency to vary in the same direction.

By activating the transistors of each circuit simultaneously into conducting and cut-off conditions, there are equalizations of the turn-on and turn-off losses of both transistors in a particular series circuit. Further, the need for matched transistors, or transistors having high emitter collector cut-off voltages, or transistors having high power ratings is obviated. The need for transistors with high emitter collector cut-off voltage ratings is materially reduced if the two transformers have very close or tight coupling.

By activating the transistors simultaneously into the cut-off and conducting states, noise and transients are materially reduced. Reduction in noise and transients lowers the current ratings of back biased diodes that shunt the emitter collector paths of each of the transistors to absorb the inductive voltages which might otherwise exist between the emitter and collector of the transistors as they become cut off. Of course, reducing the current rating of these diodes reduces the cost and size of the device, and improves efficiency.

The principles of the invention are applicable to switching elements other than bipolar transistors. Generalizing, a full inverter, in accordance with the invention, includes first, second, third, and fourth switches, each of which has a control terminal, an input terminal, and an output terminal. The switches are connected in a bridge circuit with a DC source and a load. The bridge circuit includes an apex to which the load is adapted to be connected. The input and output terminals of the first and second switches are in a first series circuit with each other, the source and the apex so that current flows in a first direction through the apex in response to the first and second switches both being closed. The input and output terminals of the third and fourth switches are connected in a second series circuit with each other, the DC source and the apex so that current flows in a second direction through the apex in response to the third and fourth switches being closed. The first and second switches are simultaneously biased into conducting and cut-off states during a first time interval, in response, inter alia, to a time reference source, that also simultaneously activates the third and fourth switches into conducting and cut-off states during a second time interval. However, because the switches are not normally matched, there is a tendency for them to be cut on and cut off at different times. The tendency is overcome and switches of the first circuit are simultaneously activated into the conducting and cut-off states by a means for coupling currents between the input terminals of the first and second switches so that in response to either of the first or second switches being rendered into a current conducting or a cut-off state, the other switch is supplied with a voltage tending to activate it into a like state. The switches of the second circuit are simultaneously activated into the conducting and cut-off states by a means for coupling currents between the input terminals of the third and fourth switches so that in response to either of the third or fourth switches being rendered into a current conducting or cut-off state, the other switch is supplied with a voltage tending to activate it into a like state. In the preferred embodiment, the switches are the bipolar transistors, and the two current coupling means are the two transformers.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWING

The single FIGURE of the drawing is a circuit diagram of a preferred embodiment of the invention.

DETAILED DESCRIPTION OF THE DRAWING

Reference is now made to the FIGURE wherein there is illustrated a full bridge inverter 11 including four bipolar NPN transistors 12, 13, 14 and 15 which function as switches. Bridge 11 is powered by a suitable DC source, such as a 300 volt source, connected between terminals 16 and 17. Bridge 11 also includes an apex 18 containing capacitor 19 in series with primary winding 20 of transformer 21, having a secondary winding 22 that is connected to a suitable load. The load connected to secondary winding 22 can be an AC load or a rectifier, if the circuit is utilized for DC to AC to DC conversion.

A time reference source (not shown) is connected to the bases of transistors 12–15 so that transistors 12 and 13 are forward biased during one-half cycle of the time reference source, while transistors 14 and 15 are back biased, and transistors 14 and 15 are forward biased during the other half cycle of the time reference source, while transistors 12 and 13 are back biased. While transistors 12 and 13 are forward biased, current flows from terminal 16 of the DC source through the emitter collector path of transistor 12, through apex 18 from left to right (as illustrated), and through the emitter collector path of transistor 13 to terminal 17. While transistors 14 and 15 are forward biased, current flows from terminal 16 through the emitter collector path of transistor 14, through apex 18 from right to left (as illustrated) and through the emitter collector path of transistor 15 to terminal 17.

Hence, during alternate half cycles of the time reference source, current flows in opposite directions through apex 18 so that an AC voltage is supplied to secondary winding 22 and the load connected to the secondary winding. Due to the nature of the current flow through the transistors, transistors 12 and 13 are considered to be in a first series circuit during one-half cycle of the time reference source, while transistors 14 and 15 are considered as being in a second series circuit during the other half cycle of the time reference source. Apex 18 is connected to each of the series circuits so that current flows in opposite directions through it via the two series circuits.

The circuit, as previously described, is well known in the art. However, a problem with the prior art circuit is that the transistors of the two series circuits do not turn on and turn off simultaneously unless expensive, matched transistor pairs are employed. If the transistors do not turn on and off simultaneously, transistors having high power ratings are employed. If the turn-on and turn-off times of transistors 12 and 13 differ from each other, or the turn-on and turn-off times of transistors 14 and 15 differ from each other, the faster transistor which turns on first must sustain the full load current when it turns on and the full inductive voltage which results from the collapse of the magnetic field of transformer 21 during turn off. During turn on, the slower transistor absorbs most of the switching dissipation and during turn off, the faster transistor absorbs the switching dissipation. Hence, there are unequal losses in the two transistors, causing one transistor to have a tendency to have greater heat dissipation and be possibly rendered ineffective unless the transistors have relatively high open circuit emitter collector voltages, $V_{CEO}$. Also, because the transistors in each series circuit turn on and turn off at separate times, current surges through the transistors occur at different times, resulting in considerable switching noise and transients. It has generally been the practice in the prior art to utilize diodes having relatively high current ratings in shunt with the emitter collector paths of transistors 12–15 to absorb these transients.

In accordance with the present invention, these problems with the prior art are obviated by providing a new and improved circuit that enables transistors 12 and 13 to be turned on and turned off simultaneously and which enables transistors 14 and 15 to be simultaneously activated into the conducting and cut-off states. The improved circuit employs two transformers 24 and 25, each having two, two-turn windings on a small torroidal core. In particular, transformer 24 includes windings 26 and 27, wound on core 28, and respectively connected to the emitters (input terminals) of transistors 12 and 13, so that each winding forms a portion of the series circuit including transistors 12 and 13. Similarly, transformer 25 includes two-turn windings 29 and 30, wound on torroidal core 31, and respectively connected to the emitters (input terminals) of transistors 14 and 15 to form portions of the series circuit including those transistors. The windings of transformers 24 and 25 are wound in such a direction as to cause transistors 12 and 13 to be simultaneously turned on, and to cause transistors 14 and 15 to be simultaneously turned on. In particular, as indicated by the dot convention on the drawing, windings 26 and 27 are wound in such a direction as to cause voltages going in opposite directions to be coupled between the emitters of transistors 12 and 13, while windings 29 and 30 are wound so that voltages of opposite polarity are induced at the emitters of transistors 14 and 15.

In operation, assume that transistor 12 is faster than transistor 13, whereby there is a tendency for transistor 12 to turn on prior to transistor 13 and for transistor 12 to turn off before transistor 13. Transformer 24 overcomes this tendency. In response to transistor 12 being driven into a conducting state by virtue of the time reference source applying a positive voltage between its base (control terminal) and the undotted end of transformer winding 26, current flows from the collector (output terminal) to the emitter of transistor 12, through winding 26 from the dotted to the undotted end. Simultaneously, the time reference source applies a positive voltage between the base of transistor 13 and the dotted end of winding 27, but transistor 13 has a tendency not to conduct as soon as transistor 12 because the base emitter impedance characteristics of transistor 13 differ from those of transistor 12. However, the present invention overcomes this tendency because the positive going current flowing through transistor 12 into the dotted end of winding 26 causes a negative voltage to be induced in the undotted end of winding 27. The negative going voltage at the undotted end of winding 27 is coupled directly to the emitter of transistor 13, to increase the forward bias between the emitter and collector of transistor 13. The increased forward bias for transistor 13 causes the transistor to be immediately switched into a conducting state. Thereby, transistors 12 and 13 are substantially simultaneously switched into a conducting state.

In response to the negative going voltage from the time reference source being applied to the bases of transistors 12 and 13, transistor 12 has a tendency to cut off prior to transistor 13. As transistor 12 cuts off, the current in winding 26 ceases so that a positive going voltage is induced at the undotted end of winding 27. The positive going voltage at the undotted end of winding 27 is coupled directly to the emitter of transistor 13 to reduce the forward bias between the emitter and collector of transistor 13, causing faster cut off of that transistor than would normally occur. Thereby, there is substantially simultaneous cut off of transistors 12 and 13. During the next half cycle, similar operations occur in transistors 14 and 15 due to the coupling of currents and voltages between the emitters of these transistors via windings 29 and 30.

As in the prior art, it is preferable to employ back biased diodes 32-35 in shunt with the emitter collector paths of transistors 12-15, respectively. However, diodes 32-35 do not merely shunt the emitter collector paths of their respective transistors, but also shunt windings 26, 27, 29 and 30 that are connected to the emitters of the respective transistors. By shunting the transformer windings, tendencies for ringing or overshoot of the voltage induced in the transformer windings are reduced by the diodes absorbing the ringing or overshoot, and these voltages are not absorbed by the emitter collector paths of the cut-off transistor switches. Diodes 32-35 have lower power ratings than the prior art diodes to reduce size, expense and heat dissipation.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. An inverter for converting power from a DC source to AC power that is supplied to a load comprising first, second, third and fourth switches, each of said switches having a control terminal, an input terminal and an output terminal, each of the switches being activated into conducting and non-conducting states between the input and output terminals in response to the voltage magnitude between the control and input terminals having values in first and second ranges, respectively; means for connecting said switches in a bridge circuit with the source and load, said bridge circuit including an apex to which the load is adapted to be connected; the input and output terminals of said first and second switches being in a first series circuit with each other, terminals for the source, and the apex, so that current flows in a first direction through the apex and between the input and output terminals of the first and second switches in response to the first and second switches both being closed; the input and output terminals of said third and fourth switches being connected in a second series circuit with each other, the source terminals, and the apex, so that current flows in a second direction through the apex and between the input and output terminals of the third and fourth switches in response to the third and fourth switches being closed; first means for simultaneously activating the first and second switches into conducting and cut-off states during a first time interval, second means for simultaneously activating the third and fourth switches into conducting and cut-off states during a second time interval; said first activating means including: (a) first means for respectively biasing the control terminals of the first and second switches relative to the input terminals of the first and second switches, said first and second switches being likely to have dissimilar characteristics in response to the voltages biasing the control terminals thereof so that one of the first and second switches has a tendency to conduct and cut off prior to the other one in response to the biasing voltages therefor, and (b) second means for coupling currents between the input terminals of the first and second switches, said second means being arranged so that in response to either of the first or second switches being rendered into the current conducting and cut-off states, the other switch is supplied with a voltage tending to activate it into a like state and substantially overcome the tendency for the first and second switches to conduct and cut off at different times; said second activating means including: (a) third means for respectively biasing the control terminals of the third and fourth switches relative to the input terminals of the third and fourth switches, and said third and fourth switches being likely to have dissimilar characteristics in response to the voltages biasing the control terminals thereof so that one of the third and fourth switches has a tendency to conduct and cut off prior to the other one in response to the biasing voltages therefor, and (b) fourth means for coupling currents between the input terminals of the third and fourth switches, said fourth means being arranged so that in response to either of the third or fourth switches being rendered into the current conducting and cut-off states, the other switch is supplied with a voltage tending to activate it into a like state and substantially overcome the tendency for the third and fourth switches to conduct and cut off at different times.

2. The inverter of claim 1 wherein the second means includes a first transformer having first and second windings respectively connected in the first series circuit and in series with the input terminals of the first and second switches, the fourth means including a second transformer having third and fourth windings respectively connected in the second series circuit to the input terminals of the third and fourth switches.

3. The inverter of claim 2 wherein each of the switches is a bipolar transistor of the same conductivity type.

4. The inverter of claim 3 further including first, second, third and fourth back biased diodes respectively connected in shunt with said first, second, third and fourth transistors.

5. The inverter of claim 3 further including first, second, third and fourth back biased diodes respectively connected in shunt with the series combinations of said first, second, third and fourth transistors and said first, second, third and fourth windings.

6. An inverter for converting power from a DC source to AC power that is supplied to a load comprising first, second, third and fourth bipolar transistors of like conductivity type, each of said transistors having a base, emitter and collector, means for connecting said transistors in a bridge circuit with the source and load, said bridge circuit including an apex to which the load is adapted to be connected, the emitter collector paths of the first and second transistors being connected in a first series circuit and with the apex so that current flows in a first direction from the source through the apex while the first and second transistors are forward biased, the emitter collector paths of the third and fourth transistors being connected in a second series circuit and with the apex so that current flows in a second direction from the source through the apex while the third and fourth transistors are forward biased, a first transformer having first and second windings connected as series elements of the first series circuit and each having a terminal respectively connected to the emitters of the first and second transistors, said first and second windings being wound so that the voltages at the emitter of the first and second transistors have a tendency to vary in the same direction, a second transformer having third and fourth windings connected as series elements of the second series circuit and each having a terminal respectively connected to the emitters of the third and fourth transistors, said third and fourth windings being wound so that the voltages at the emitters of the third and fourth transistors have a tendency to vary in the same direction.

7. The inverter of claim 6 further including first, second, third and fourth back biased diodes respectively shunting the series combinations of the first, second, third and fourth transistors, and the first, second, third and fourth windings.

* * * * *